Patented Nov. 29, 1938

2,138,087

UNITED STATES PATENT OFFICE 2,138,087

STABILIZATION OF DRIER COMPOSITIONS

Paul E. Burchfield, Yeadon, Pa., assignor to The Harshaw Chemical Company, Elyria, Ohio, a corporation of Ohio No Drawing. Application July 13, 1936, Serial No. 90,381

14 Claims. (Cl. 134—57)

Metallic drier compounds, such as cobalt naphthenate, manganese compounds, etc., are prone to form precipitates when in mixtures of thinners such as mineral spirits; and in accordance with the present invention it now becomes possible however to provide such compositions which remain in stable condition irrespective of various admixtures and dilutions, such that the product as initially put out will continue to present a desired uniformity of character. Furthermore, there is less tendency for precipitates to form in drying oils, such as linseed oil containing a drier such as cobalt naphthenate, when the driers are added in the form of one of the improved compositions hereinafter described.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

A metallic drier compound, is, in accordance with the invention, treated by incorporation of a small amount of nitrogen compound from the group consisting of benzamide, ureas, and guanidine, and salts of primary, secondary and tertiary substituted ammonia, pyridine and benzamide. The particular acid radical, if the salt be employed, is of slight importance, it being understood that the compound will be suitably miscible in the ultimate oil or solvent vehicle, and it may be in general of the organic or carboxylic acids, aliphatic, aromatic and naphthenic acids. Particularly advantageous are the nitrogen compounds of the group of primary, secondary and tertiary substituted ammonia salts of organic acids, aliphatic, aromatic and naphthenic. Into the metallic drier compounds, such as naphthenates of cobalt, manganese, etc., resinates of lead, etc., the nitrogen compound may be incorporated, with, if desired, a diluent, as mineral spirits sufficient to thin up the drier. Thus, triethanolamine, acetate, triethanolamine naphthenate, triethanolamine salicylate, n-amyl amine salicylate, diethyl amine salicylate, methyl ethyl aniline salicylate, ethylene diamine salicylate, benzamide salicylate, etc., are convenient materials. Such agents may be employed with the drier metal salt in amounts of 1 to 6 per cent, being thoroughly incorporated, preferably with moderate heating. While the amounts of stabilizing agent desirable are in general as above indicated, it will be readily understood that these are capable of variation, and in the case of the nitrogen compounds of naphthenic acid, there is of course also some variation in the naphthenic acid itself, depending upon its source, and possible impurity content.

As an example: To 100 parts of cobalt naphthenate (12 per cent cobalt) there is added benzamide 3 parts, and the mixture is stirred thoroughly, with heating to 135–145° C. until homogeneous.

As another example: With cobalt naphthenate there is similarly incorporated 3 parts of triethanolamine salicylate.

As another example: With manganese naphthenate (11 per cent Mn) 100 parts, there is incorporated 3 parts of triethanolamine acetate.

As another example: With mangenese naphthenate similarly, there is incorporated 3 parts of diethylamine salicylate.

As another example: With lead resinate (4 per cent lead content) there is incorporated 6 parts of methyl ethyl amine salicylate.

The foregoing illustrate preparation of solid products. For liquid products, similar compositions may be prepared, with the additional incorporation of mineral spirits. Thus:

100 parts of cobalt naphthenate (12 per cent Co), 94 parts of mineral spirits, and 3–6 parts of any of the said stabilizing agents.

Similarly:

100 parts of fused lead resinate (16 per cent Pb), 94 parts of mineral spirits, and 3–6 parts of a stabilizing agent, as indicated.

Other modes of applying the principle of the invention may be employed, change being made as regards the details described, provided the features stated in any of the following claims, or the equivalent of such, be employed.

I therefore particularly point out and distinctly claim as my invention:—

1. A process of stabilizing drier compositions, which comprises incorporating therewith a small amount but not substantially less than one per cent of a salt formed by reacting an organic nitrogen compound from the group consisting of primary, secondary and tertiary substituted ammonia, pyridine and benzamide with an organic acid.

2. A process of stabilizing drier compositions, which comprises incorporating therewith a small amount but not substantially less than one per cent of an organic nitrogen salt formed by reacting a substituted ammonia with an organic acid.

3. A process of stabilizing drier compositions, which comprises incorporating therewith a small amount but not substantially less than one per cent of a diethyl amine salt of a carboxylic acid.

4. A process of stabilizing drier compositions, which comprises incorporating therewith a small amount but not substantially less than one per cent of a methyl ethyl aniline salt of a carboxylic acid.

5. A process of stabilizing drier compositions, which comprises incorporating therewith a small amount but not substantially less than one per cent of a triethanol amine salt of a carboxylic acid.

6. A process of stabilizing drier compositions, which comprises incorporating therewith a small amount but not substantially less than one per cent of triethanolamine salicylate.

7. A process of stabilizing drier compositions, which comprises incorporating therewith a small amount but not substantially less than one per cent of a triethanolamine naphthenate.

8. A drier composition comprising a metallic drier salt and a small amount but not substantially less than one per cent of a salt formed by reacting an organic nitrogen compound from the group consisting of primary, secondary and tertiary substituted ammonia, pyridine and benzamide with an organic acid.

9. A drier composition comprising a metallic drier salt and a small amount but not substantially less than one per cent of an organic nitrogen salt formed by reacting a substituted ammonia with an organic acid.

10. A drier composition comprising a metallic drier salt and a small amount but not substantially less than one per cent of a diethylamine salt of a carboxylic acid.

11. A drier composition comprising a metallic drier salt and a small amount but not substantially less than one per cent of a methyl ethyl aniline salt of a carboxylic acid.

12. A drier composition comprising a metallic drier salt and a small amount but not substantially less than one per cent of a triethanolamine salt of a carboxylic acid.

13. A drier composition comprising a metallic drier salt and a small amount but not substantially less than one per cent of triethanolamine salicylate.

14. A drier composition comprising a metallic drier salt and a small amount but not substantially less than one per cent of a triethanolamine naphthenate.

PAUL E. BURCHFIELD.